Nov. 15, 1949  E. P. FELCH, JR., ET AL  2,488,389
DETECTION SYSTEM
Filed Sept. 25, 1945
3 Sheets-Sheet 2

INVENTORS  E. P. FELCH, JR.
F. G. MERRILL
T. SLONCZEWSKI
BY Walter M. Hill
ATTORNEY Nov. 15, 1949

UNITED STATES PATENT OFFICE 2,488,389

DETECTION SYSTEM

Edwin P. Felch, Jr., Chatham, N. J., and Francis G. Merrill, Yonkers, and Thaddeus Slonczewski, Glenwood Landing, N. Y., assignors to Bell Telephone Laboratories, Incorporated, New York, N. Y., a corporation of New York Application September 25, 1945, Serial No. 618,550

7 Claims. (Cl. 175—183)

This invention relates to magnetic measuring and more particularly to a system of great sensitivity for measuring minute changes in the strength of a magnetic field.

It is a well-known fact that the earth's magnetic field over any given limited area is substantially uniform except that this uniformity may suffer distortion in the presence of paramagnetic or diamagnetic material. This distortion usually results in a change in both the direction and absolute intensity of the field. In most cases the paramagnetic or diamagnetic body which produces the magnetic distortion is located at a considerable distance from the field strength measuring or indicating device and if the distorting material is to be detected, the measuring or indicating device must be highly sensitive and well compensated against extraneous influences.

In the copending patent application of T. Slonczewski filed April 20, 1943, Serial No. 483,756, now Patent No. 2,485,931, issued October 25, 1949, there is disclosed a detector system for indicating the intensity of a magnetic field irrespective of the position taken by the detecting element in space. That system employed three magnetic elements mounted with their principal magnetic axes mutually perpendicular. They were excited with an alternating magnetomotive force of constant intensity to generate even order harmonics in windings on each magnetometer which were found to be proportional to the product of the absolute field strength and the cosine of the angle between the principal axis of each magnetometer and the direction of the field. An even order harmonic was selected from each magnetometer, squared in a squaring circuit and the three squared output currents or voltages were added together and measured by a direct current measuring means. It was shown that the reading of the direct current measuring means was a measure of the absolute total field intensity irrespective of the orientation of the detector elements in space.

In another copending application of E. P. Felch and T. Slonczewski also filed April 20, 1943, Serial No. 483,755, now Patent No. 2,468,968, it is shown that for practical reasons if one of the three mutually perpendicular elements is kept in substantial alignment with the field, considerable improvement in accuracy could be achieved even though it is theoretically unnecessary to so orient them with respect to the field.

Both of the aforementioned copending applications employed means for squaring all three magnetometer outputs before adding them together in order to compensate for the position of the detector system in space. They may, therefore, be called three-element-squared systems and fundamentally the outputs of these systems are proportional to the square of the total field observed. It is sometimes desirable to have the output vary directly as the first power of the field instead of as the square without losing the advantages of compensation afforded by the three-element-squared system.

It is an object of this invention to provide a compensated magnetic field detector system which produces an output proportional to the first power of the field intensity.

The foregoing object is achieved by this invention which comprises in combination a detector magnetometer comprising a core of magnetic material having a principal magnetic axis and two orienting magnetometers each similar to said detector magnetometer. Windings are placed on each of said cores and they are supported with their principal axes mutually perpendicular. A source of alternating current is connected to windings of each magnetometer whereby even order harmonic voltages are generated therein of magnitudes proportional respectively to the product of the field strength and the cosine of the angle formed between the principal axis of each core and the direction of the field. An orienting means including an electric motor means is connected to windings on said two orienting magnetometers and is responsive to selected even order harmonic voltages generated in the orienting magnetometers for maintaining the principal axis of said detector in substantial alignment with the direction of the field to be observed. An electric squaring means responsive to a selected even order harmonic voltage generated in each of the two orienting magnetometers produces a compensating direct current varying as a function of the sum of their squares. A circuit connects the squaring means to the detector magnetometer so that the compensating direct current is passed directly through the detector magnetometer to compensate its response to any small angular misalignment with the field observed. A linear detector derives a direct current from a selected one of the even order harmonic voltages generated in the detector magnetometer, the output whereof is substantially proportional to the first power of the strength of the field observed, which output is read by a direct current indicating instrument or may be recorded on a recorder.

In the copending application of T. Slonczewski Serial No. 618,551, filed on even date herewith, there is disclosed and claimed the broad invention to a system of this type wherein the compensating current is passed into the detector magnetometer circuit to compensate the detector element for any small angular misalignment with the field. The specific embodiment wherein the compensating current is added directly to the linearly detected direct current in the detector channel is also claimed in the copending application.

These magnetometers comprise essentially a length of low retentivity magnetic material preferably of high permeability and upon which one or more windings are wound. In the drawings only one winding has been shown. However, more than one winding obviously may be employed. It has been discovered that when the magnetic field is at right angles to the principal axis of the core and the winding be excited by a voltage of fundamental frequency, no even order harmonics will be generated in the winding. On the contrary, if the magnetic field has a component in the direction of the principal axis of the core and the winding be excited by a voltage of fundamental frequency, even order harmonic voltages will be generated therein. The magnitude of these harmonic voltages will each be proportional to the cosine of the angle formed by the principal axis of the magnetometer and the direction of the magnetic field. While any one of these harmonics can be used the second harmonic is selected in illustrating this invention.

Figure 1:
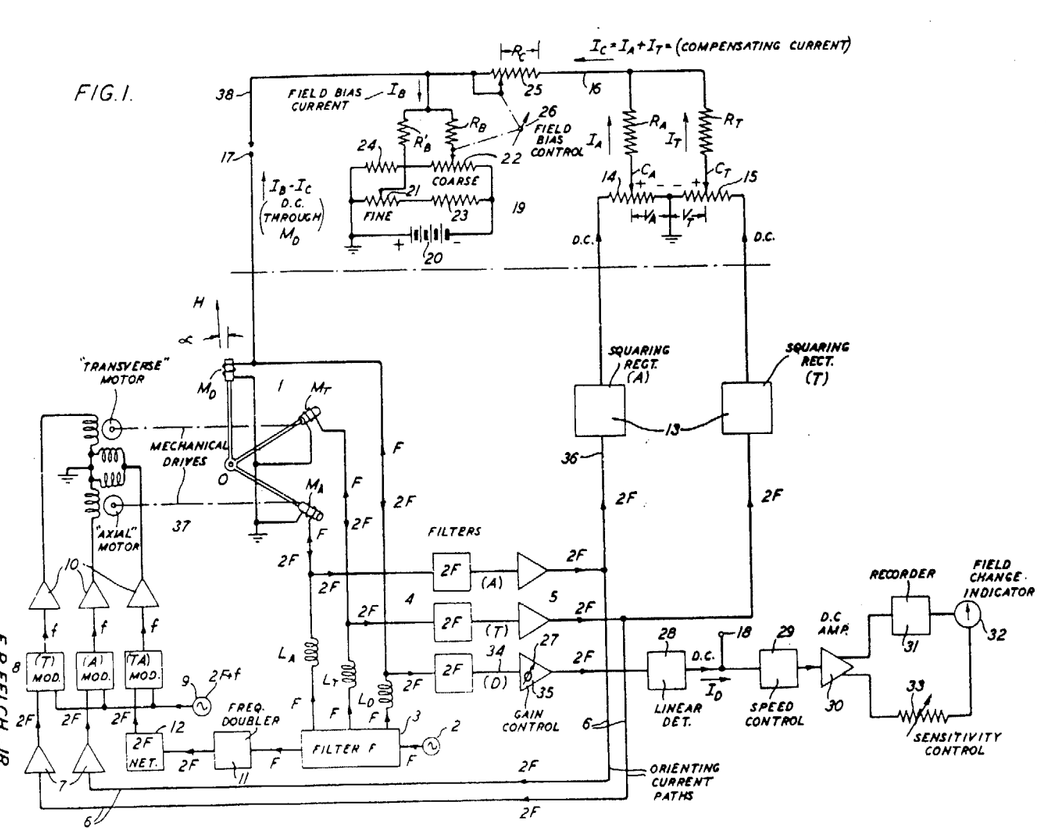
Fig. 1 discloses an embodiment of the invention in block form.

It can be shown mathematically that the sum of the squares of these three second harmonic voltages is entirely independent of the orientation of the three magnetometers with respect to the direction of the magnetic field providing the three magnetometers are retained in mutual perpendicular relationship and they are equally sensitive. In accordance with this invention it can be shown mathematically that if the outputs of the axial and transverse magnetometers are each squared and the sum of the squares of the output currents be passed into the detector magnetometer circuit, it will automatically compensate the change in output current from the detector magnetometer due to slight misalignment of the detector magnetometer with respect to the direction of the field. This slight misalignment is shown in Fig. 1 by a small angle $\alpha$. It can be shown that this compensation is extremely good providing the angle of deviation $\alpha$ is kept relatively small, say within about 3 degrees.

The invention may be better understood by referring to the accompanying drawings in which.

Referring now more particularly to Fig. 1 the three magnetometers mounted in a mutual perpendicular relationship are generally denoted by the reference numeral 1. These three magnetometers are called for convenience the detector magnetometer, the transverse magnetometer and the axial magnetometer, respectively, designated by the reference characters $M_D$, $M_T$ and $M_A$. The transverse and axial magnetometers are also hereinafter referred to as the orienting magnetometers in that the voltages derived from these magnetometers are used for orienting the detector magnetometer into substantial alignment with the direction of the field shown in Fig. 1 by the vector H. As will be hereinafter more particularly described the orienting function is such as to maintain the detector magnetometer $M_D$ in alignment with the magnetic field vector H within a small angle $\alpha$. It will be clearly understood from solid geometry that if three axes are mutually perpendicular and two of them are kept normal with a particular direction or line, it necessarily follows that the third axis will be in alignment with that direction or line. Thus it follows that if the transverse and axial magnetometers $M_T$ and $M_A$ maintain their principal axes normal to the direction of the field vector H, the direction of the principal axis of the detector magnetometer $M_D$ will be in alignment with that field. The means whereby a magnetic system of this type may maintain such orientation forms the subject-matter of the aforesaid application of E. P. Felch and T. Slonczewski. However, for the purposes of this specification it will be described briefly later on in this specification.

A source of alternating current 2 of frequency F is connected to all three of the above-mentioned magnetometers through a filter network 3. This network is arranged to pass the fundamental frequency F from the alternating current source 2 and reject all harmonics thereof. These currents of frequency F are passed through the three magnetometers by way of obvious circuits from the filter 3 including the three inductances $L_A$, $L_T$ and $L_D$, respectively. It may here be stated that the subscript letters A, T and D used in connection with the magnetometers and inductances refer to the axial, transverse and detector channels respectively. For convenience this has been carried throughout Fig. 1 not only as subscripts but occasionally in parentheses to denote to which of the three magnetometers the particular channel is related.

The currents of frequency F will generate in these magnetometers a series of harmonics. For purposes of detection in accordance with the principles of this invention the even order harmonics are the only ones of interest as these have been found to vary in accordance with the cosine of the angular displacement of the principal axis of the magnetometer with the direction of the field. These even order harmonics, for example, the second harmonic of frequency 2F, develops voltages of that frequency across inductances $L_A$, $L_T$ and $L_D$. The currents of second harmonic frequency are passed through filters 4 and amplified by amplifiers 5.

Orientation is achieved in accordance with the principles described in the aforementioned application of E. P. Felch and T. Slonczewski which may be briefly described as follows. The second harmonic output voltages from the axial and transverse channels coming from the amplifiers 5 in these two channels are carried over circuits 6 to amplifiers 7. The outputs of the two amplifiers 7 are applied to the transverse and axial modulators 8 where the frequencies are changed to frequency $f$, amplified by amplifiers 10 and applied to windings in the two two-phase motors of the orienting mechanism 37. The actual construction of this mechanism will be described in greater detail in connection with Fig. 5. The suitable frequency $f$ for driving the motors is derived from the modulators 8 by reason of the modulation of the second harmonic frequencies 2F and the output of the separate oscillator 9. The actual modus operandi of this modulation process need not be described as it is well known in the electronic art.

The outputs from the transverse and axial modulators 8 are applied to one of the phase windings in each of the two orienting motors of the orienting mechanism 37. These motors are designated the "transverse" motor and the "axial" motor in accordance with the magnetometer to which they are responsive. The other phase winding of each of these two motors is constantly excited from a source of the same frequency $f$ by means of the following circuit. A source of frequency F is obtained from the filter 3 and applied to the frequency doubler 11 where it is doubled to a frequency 2F. Actually the frequency doubler produces a number of harmonics and in order to peak the output of the frequency doubler to the second harmonic the output from the doubler 11 is passed through a network 12 which readily transmits the second harmonic. This may be most any type of tuned network which may have a parallel antiresonant circuit, a series resonant circuit, or both. The second harmonic output of this network 12 is thus made of the same frequency 2F as the output from the two orienting amplifiers 7. Consequently when modulated with the same source 9 as is used in connection with the output from the two amplifiers 7 the same frequency $f$ is derived.

So long as the axial and transverse magnetometers $M_A$ and $M_T$ are exactly normal to the direction of the field there will be no even order harmonics generated in their windings and consequently there will be no output voltage coming from the axial and transverse amplifiers 5 to be transmitted through the orienting circuit conductors 6 to the modulators 8. Therefore, the only voltage applied to the two orienting motors is that applied to one of the phase windings in each of the motors. The motors therefore remain stationary. Should, however, either of the two orienting magnetometers, or both of them, become inclined at an angle slightly different from 90 degrees with the direction of the field by reason of the detector magnetometer becoming slightly misaligned from the field, second harmonic voltages proportional thereto will be derived from the axial and transverse amplifiers 5 and transmitted over the orienting circuits 6. This results in voltages being applied to the other phase windings of one or both of the orienting motors producing rotation in the proper direction to return its associated magnetometer into a position normal with the direction of the field, whereupon the motor will again stop. The mechanical connection between the transverse and axial motors is shown schematically by means of dotted lines in Fig. 1 indicating that each motor is associated with its own magnetometer to correct its position should it become misaligned from the normal with the direction of the field.

Since the output of the detector magnetometer $M_D$ is proportional to the product of the intensity of the field vector H, and the cosine of the angle $\alpha$ it is obvious that some compensation is needed for the output of the detector magnetometer when it deviates slightly from exact alignment with the field. This compensation is provided in accordance with the principles of this invention by squaring the output from the axial and transverse channels and applying the sum of the squares of these two outputs to the detector magnetometer channel.

One way of accomplishing this is shown in Fig. 1 wherein squaring rectifiers 13 are connected to the outputs of the axial and transverse amplifiers 5. These squaring rectifiers are of a type which produce an output direct current proportional to the square of the input alternating voltage. The output currents from the axial and transverse squaring rectifiers are passed through potentiometers 14 and 15, respectively. A portion of the resulting voltages are selected by adjusting the sliders $C_A$ and $C_T$ of these potentiometers to derive voltages $V_A$ and $V_T$, respectively. These voltages are positive at the sliders with respect to ground and produce currents $I_A$ and $I_T$, respectively, through series resistors $R_A$ and $R_T$. Since the upper ends of these two resistors are joined together by conductor 16, these two currents are added and comprise a compensating current $I_C$ which is passed through the detector magnetometer circuit.

In Fig. 1 this compensating current is passed directly through the detector magnetometer winding in such a direction as to increase the amount of applied field to the magnetometer. Now it will be remembered that so long as the detector magnetometer is in exact alignment with the field there will be no output voltage from the axial and transverse channels and consequently the compensating current will be zero. This is as it should be since no compensating current is required. On the other hand, if a slight misalignment of the detector magnetometer takes place the compensating current thus developed will increase the field sufficiently to just compensate for the amount of field component loss on the detector magnetometer due to the slight misalignment. As previously stated this compensation can be shown mathematically to be extremely accurate for relatively small angles and in practice it has been found that the degree of precision in orientation is sufficiently good so that the compensation allows no appreciable error in detection.

In order to measure the response of the detector magnetometer $M_D$ to the strength of the field the output thereof is passed through its second harmonic filter 4 in the detector channel (D), through conductor 34 and is amplified in amplifier 27. The output of this amplifier is applied to a linear detector 28 so that the direct current output therefrom is directly proportional to the first power of the second harmonic voltage generated in the detector magnetometer. This output current $I_D$ is passed through a speed control network 29, which will be more particularly described later in connection with Fig. 6, and applied to the input circuit of a direct current amplifier 30, the output of which is connected to a suitable recorder 31, visual indicator 32 or both. A sensitivity control 33 may be connected in series in order to adjust the response of the indicators. Since the output of the detector magnetometer has been linearly detected by detector 15, the indication will be in proportion to the first power of the intensity of the total field.

Considerably increased precision to changes in the magnitude of the total field may be achieved by balancing out part of the earth's field applied to the detector magnetometer $M_D$. This is achieved by means of the field biasing network 19 which comprises a stable direct current source 20 and potentiometers 21 and 22. Potentiometer 22 provides a coarse adjustment of voltage at its slider with respect to ground whereas the fine adjustment 21 provides a fine adjustment therefor. It will be noted that the polarity of the direct current source 20 is in reverse sense with respect to ground as compared with the polarity of the outputs from the squaring rectifiers 13. Field bias source 20 therefore provides a field bias current $I_B$ through the detector magnetometer $M_D$ in a direction to reduce considerably the amount of field applied to the detector magnetometer. This field bias may be adjusted to any predetermined desired amount. In practice, it has been found quite desirable to balance out about 90 per cent of the field applied by the earth's magnetism. This increases considerably the accuracy with which the equipment may detect small changes in the earth's field or any other field in which the magnetometer system may be immersed. For example, with a field intensity in the order of 55,000 gamma the field bias adjusting means 19 is adjusted to balance out all but about 5,000 gamma so that the detector magnetometer is required to detect changes in only 5,000 gamma rather than changes in 55,000 gamma, thereby increasing considerably the accuracy with which the changes may be detected. It is, of course, obvious that the field bias means 19 may be adjusted to balance out different amounts of the total field.

In the particular embodiment specifically shown in Fig. 1 the compensating current $I_C$ is collected in conductor 16 from the axial and transverse currents $I_A$ and $I_T$, respectively. This compensating current is then added algebraically to the field bias current $I_B$ and by way of conductor 38 and terminal 17 it is passed through the detector magnetometer winding to combine the effect of the compensating current and the field bias current in the detector magnetometer circuit.

A rheostat 25 is shown in series with conductor 16 and conductor 38. This rheostat adjusts the effect of the compensating current on the detector magnetometer and adjusts the system to operate correctly with fields of different intensity. In using a two-element squared system of the type disclosed in this invention it is necessary that the compensating current be adjusted for different field intensities to be measured. Consequently, when the apparatus is being adjusted for zero indication in a particular field the coarse adjusting potentiometer 22 of field bias means 19 is adjusted to balance out a sufficient amount of the field to bring the indicator to zero. If the apparatus is being adjusted to zero in a different field intensity, potentiometer 22 must be adjusted to a different point. Therefore, both rheostat 25 and potentiometer 22 must be adjusted in accordance with the intensity of the field to be measured and are consequently ganged together through a common control 26 so that as the field bias control is adjusted to change the position of potentiometer 22 the series rheostat 25 is automatically and simultaneously adjusted to correct the effect of the compensating current for the different field strengths being measured.

Figure 2:
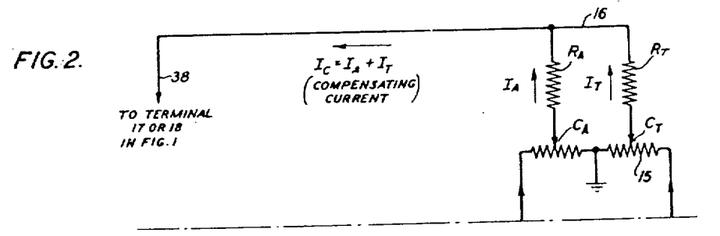
Figs. 2 and 3 show modifications of the circuit disclosed in Fig. 1.

If it is desired to measure the total absolute field rather than the residual unbalanced portion thereof, it is unnecessary to use the field bias control means 19. It is also unnecessary to use a series rheostat 25 as shown in Fig. 2 as the effect of the compensating current may be independently adjusted by means of the two potentiometers 14 and 15. Fig. 2 clearly shows the alteration to be made in Fig. 1 in order to measure the total absolute field. In this figure it will be noted that the field bias control means 19 has been eliminated as has also the rheostat 25 and that the connection 38 may be connected to either terminal 17 or terminal 18 of Fig. 1. Terminal 18 in Fig. 1 is located in the detector channel between the linear detector 28 and the speed control circuit 29. It will thus be seen that the connection for the compensating current may be made to either of two places in the detector channel. The connection to terminal 17 is somewhat preferred since it reduces the stability requirements on the various amplifiers and transfers them to the field bias battery source 20. Otherwise the effect of using either terminal 17 or terminal 18 is substantially the same. When the connection is made to terminal 18 the compensating current which is, of course, proportional to the sum of the squares of the two orienting magnetometer outputs is added to the linearly detected output of the detector magnetometer. It can be shown mathematically that the effect of this connection is substantially the same as the effect of the connection to terminal 17.

Figure 3:
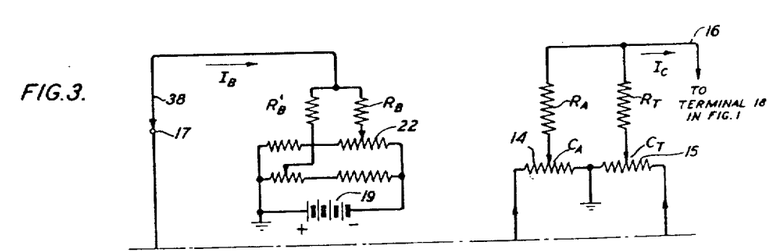

If it is desired that the compensating current be added to the linearly detected current from detector 28, that is, the compensating current conductor 16 is connected to terminal 18 and it is also desired to balance out a large part of the total absolute field, the circuits of Fig. 3 may be used to modify Fig. 1. In this case the field bias control circuit 19 is connected to the detector magnetometer by way of conductor 38 and terminal 17, while the compensating current derived from the sum of the squares of the outputs of the two squaring rectifiers 13 is conveyed by way of conductor 16 to terminal 18.

Squaring rectifiers 13 may be of any type well known in the art as, for example, they may be of the harmonic generator type disclosed in the copending application of E. P. Felch and T. Slonczewski filed April 20, 1943, Serial No. 483,754, now Patent No. 2,427,666, or they may employ parabolic or square law rectifiers of the type disclosed in the aforementioned copending application of T. Slonczewski, the latter being of the same general type shown in Fig. 4 of this application.

Figure 4:
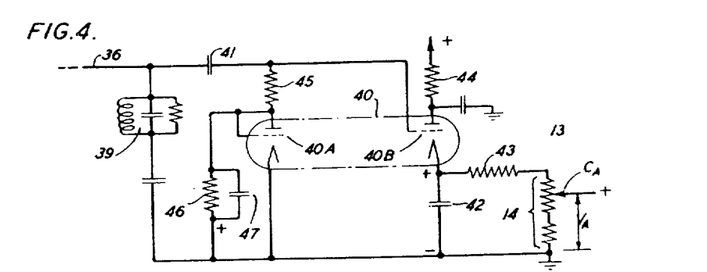
Fig. 4 shows one kind of squaring rectifier which may be employed for squaring the output of the orienting magnetometer circuit.

In Fig. 4 the squaring rectifier circuit for one of the squaring rectifiers 13 of Fig. 1 is disclosed. In this figure the second harmonic output of the axial magnetometer channel is transmitted to the input circuits of the rectifier by way of conductor 36. A tuned circuit 39, broadly tuned to the second harmonic, is connected across the input circuit to the rectifier. This rectifier utilizes a twin triode 40. In the description of the operation of this circuit we may neglect for the moment the effect of the triode section 40A. The rectifier proper is actually associated with the triode section 40B. This is a conventional square law rectifier operating on the principle of plate rectification. The voltage of second harmonic frequency is applied to the grid circuit through condenser 41 and by means of plate rectification the plate current flowing through resistor 44, resistor 43 and potentiometer 14 will vary in magnitude as the square of the applied alternating voltage to the grid circuit. Consequently the output voltage $V_A$ appearing between the slider control $C_A$ of potentiometer 14 and ground is proportional to the square of the input second harmonic voltage.

It has been found that the plate current of such a rectifier is not only a function of the square of the magnitude of the input voltage but is also a function of the temperature of the cathode. As the temperature of the cathode increases the plate current also increases as is well known in the art. To compensate for this variation the triode section 40A is connected as a diode in series with resistance 45. The emission from the cathode in the diode section 40A develops a space current across the space between the anode and cathode, which space current develops a voltage across condenser 47 and resistor 46 with the polarity as indicated in Fig. 4. This voltage varies with the temperature of the cathode, increasing with increasing temperature. It will be noted that resistor 46 is connected in series with condenser 42 and resistor 45 thereby adding to the bias on the grid of the triode section 40B. Both cathodes are heated in a conventional manner from the same source of current, not shown, so that as the heater current increases or decreases slightly, the temperatures of the two cathodes will tend to remain equal. As has already been stated, an increase in cathode temperature will cause an increase in the plate current through the triode section 40B but this increase in plate current can be compensated by the increase in bias voltage generated in the diode section 40A and conversely, the decrease in cathode temperature will be similarly compensated. This increases considerably the accuracy with which the squaring rectifier will produce an output direct current proportional to the square of the input applied alternating voltage. The invention disclosed in this compensating means forms the basis for the copending application of C. H. Young, Serial No. 618,549, filed on even date herewith.

Figure 5:
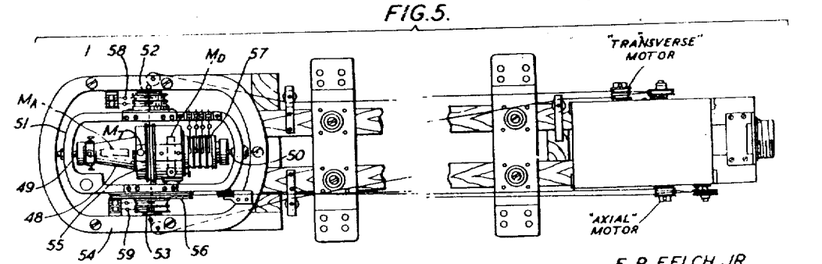
Fig. 5 discloses an orienting mechanism suitable for controlling the position of the magnetometer elements with respect to the field.

The three magnetometers may be mounted on most any kind of structure which will hold them in mutually perpendicular relationship. This structure should then be mounted as a rotor in a gimbal mechanism so that the magnetometer elements may be freely adjusted to any position in space. A preferred form of such mechanism is disclosed in the copending application of W. J. Means, filed July 30, 1943, Serial No. 496,833, now Patent No. 2,427,014. For convenience this mechanism is also disclosed in Fig. 5 wherein the gimbal structure 1 is shown at the left and the two drive motors for the transverse and axial channels are shown on the right. The two drive motors are coupled to the gimbal structure through mechanical drives in the form of flexible cables. In the gimbal mechanism 1 the inner rotor supporting structure 48 is shown mounted on bearings 49 and 50. The shafts for these bearings are secured to an inner ring 51 which in turn is supported on two hollow shafts 52 and 53 secured to the outer ring 54. It will thus be seen that by means of the bearings 49 and 50, the axis of rotation of which is at right angles with respect to that of shafts 52 and 53, the inner rotor 48 may be positioned so that a diameter thereof may take any direction in space. Since the detector magnetometer $M_D$ lies on a diameter of the rotor 48 as shown in Fig. 5 the detector magnetometer may thereby be rotated in alignment with the field regardless of the direction of the field in space. The two orienting magnetometers, designated the axial magnetometer $M_A$ and the transverse magnetometer $M_T$, are so designated by reason of their positions with respect to the principal axis of the rotor 48.

It will be seen in Fig. 5 that the axial magnetometer $M_A$ lies along the axis of rotation of the rotor 48 whereas the transverse magnetometer is transverse to that axis. The transverse motor drives the rotor 48 about its axis on bearings 49 and 50 through a mechanical drive comprising a flexible cable passing over the motor pulley through the hollow shafts 52 and 53 and around a pulley 55 attached to the rotor 48. It will thus be seen that whenever the transverse magnetometer $M_T$ lies at any angle less than 90 degrees with respect to the direction of the field, the transverse motor may drive the rotor 48 until the transverse magnetometer is again realigned with the normal to the field. A similar driving arrangement is provided for the axial magnetometer wherein the axial motor drives the inner ring 51 about its axis defined by the bearings 52 and 53 through a flexible cable passing over the axial motor pulley and a pulley 56 attached to the inner ring 51. The action of the axial magnetometer in causing the axial motor to rotate this inner ring 51 is similar to that already described for the transverse magnetometer. It will be understood that by reason of the combined action of the two orienting magnetometers, the detector magnetometer may be oriented into alignment with the direction of the field and automatically maintained in that position regardless of any shifting of the field itself or shifting of the mechanical structure with respect to the field.

The electrical connections to the three magnetometers are made through slip rings and brushes 57. One of these brushes connects to ground whereas the other three connect to the three magnetometers as shown in Fig. 1. The brushes are mounted on the inner ring 51 and connections from them are carried to another group of four slip rings divided for convenience into two parts 58 and 59. The brushes of these four slip rings are attached to the stationary outer ring 54 and the electrical connections are thereby easily connected to the external circuit by means not shown in Fig. 5 but the circuits therefor are clearly shown in Fig. 1.

Figure 6:
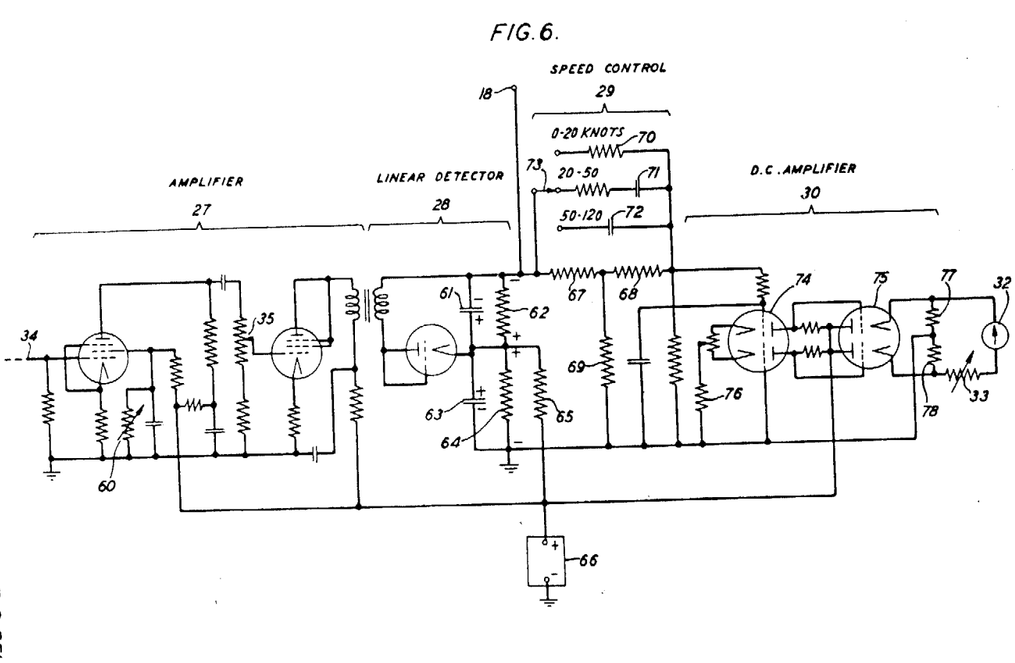
Fig. 6 shows a preferred form of indicator circuit for the detector magnetometer channel.

More detailed circuits for the detector channel are shown in Fig. 6. Comparing this figure with Fig. 1 it will be noted that the output of the second harmonic filter coming from the detector magnetometer is transmitted to the input circuit of amplifier 27 by way of conductor 34. These reference numerals are shown on both figures. In Fig. 6 it will be noted that the amplifier 27 comprises two stages with a gain control 35. The amplifier is generally of conventional form and need not be described in detail except that a control rheostat 60 has been provided to adjust the screen grid voltage until the over-all gain of the amplifier is compensated automatically for variations in plate supply voltage. When this adjustment is properly made small variations in plate supply voltage will not appreciably affect the gain of this amplifier.

The output of the amplifier 27 is applied to a linear detector circuit 28 of conventional form. The direct current output of this detector appears as a voltage across condenser 61 and resistor 62, with the polarity as indicated in Fig. 6. This output direct voltage is opposed by a fixed direct voltage across resistor 64 derived from current from source 66 through resistor 65. This latter voltage may be termed an "offset" voltage since it determines the amount of net field which must remain in the detector magnetometer to produce an equal output direct voltage across resistor 62. Therefore, the amount of offset or net field remaining in the detector magnetometer after adjusting the field bias network 19 to make the indicator 32 read zero is determined by the offset voltage across resistor 64.

The difference voltage appearing across resistors 62 and 64 in series will vary in proportion to the magnitude of the second harmonic voltage coming from detector magnetometer $M_D$. This voltage is applied to the input circuit of a direct current amplifier 30 through a speed control network 29. This speed control network comprises two resistors 67 and 68 which are relatively high compared to a shunt resistor 69 and three parallel networks 70, 71 and 72, respectively, which may be switched at will across the relatively high resistors 67 and 68. Networks 70, 71 and 72 are switched by means of a suitable switch 73 which, if switched to its upper terminal will connect resistor 70 across high resistors 67 and 68. In this position the system is sensitive to the magnitude of a static field. Sometimes, however, it is desirable to have the apparatus responsive only to rapid changes in a field. This is particularly true where the system is being carried by aircraft at considerable speed. In such cases the switch 73 is switched to either of the other two circuits depending upon the speed that the aircraft is expected to travel. When switched to either of these latter two positions it will be noted that only an alternating current path exists, except for networks 67, 68 and 69, between the switch 73 and the right-hand end of resistor 68 thereby rendering the circuit responsive only to rapid changes in the strength of the field. If the switch 73 is on either of the two positions where network 71 or 72 is in circuit and the aircraft is held stationary as, for example, an aircraft of lighter than air type or the aircraft is moving in a constant field, the input voltage to the direct current amplifier 30 will be reduced to a relatively low value determined by the network of resistances 67, 68 and 69. This latter resistance network provides a low sensitivity direct current path to the upper grid of twin triode 74 since resistors 67 and 68 are high compared with resistor 69. This gives an indication on indicator 32 of large slow changes in the field to give warning of approaching overload on amplifier 27.

The two-stage direct current amplifier 30 comprising twin triodes 74 and 75 requires very little description. When the input voltage is applied to the upper grid of tube 74 a voltage appears across resistor 76 in the common cathode circuit. This voltage is applied to the lower grid of the twin triode 74 in opposite sense and therefore this section of tube 74 acts as an inverter. The input circuit of tube 75 is direct coupled to the output circuit of tube 74 and the difference voltage appearing across the cathode resistors 77 and 78 is applied to the indicator circuit including the indicator 32 and sensitivity adjusting rheostat 33. A recorder may also be included in this circuit if desired as shown in Fig. 1.

Having described the circuits of this invention in considerable detail the method of setting them up for operation will be described. While the description is confined to the particular embodiment specifically shown in Fig. 1 it will be obvious to those skilled in the art that the same kind of adjustments will set the apparatus up for the modified circuits shown in Figs. 2 and 3, consideration of course being given to the fact that in Fig. 2 no field bias network 19 is employed.

It may be assumed that the power is all turned on and that all amplifiers are at their normal operating temperature. The sensitivity control 33 should be adjusted for minimum sensitivity, that is, with maximum resistance in the circuit. The speed control 29 should be adjusted for static field operation, that is, with switch 73 shown in Fig. 6 on its upper contact. The field bias control knob 26 should now be adjusted until indicator 32 reads approximately zero. The sensitivity control 33 should be readjusted to increase the sensitivity after which the fine control 21 will trim the field bias to the point where substantially zero output is obtained from amplifier 30 and meter 32 reads zero.

The control knob 26 gangs rheostat 25 and the coarse field bias adjusting potentiometer 22 so that when the field bias control potentiometer 22 increases the amount of field bias current $I_B$, the resistance $R_C$ of rheostat 25 is also simultaneously increased. By thus adjusting the field bias current it will be obvious that a net amount of field applied to the detector magnetometer $M_D$ will be reached where its output as detected by the linear detector 28 will produce a voltage which will just balance the offset voltage appearing across resistor 64 shown in Fig. 6. This condition will be reached preferably when a large predetermined percentage, say about 90 percent, of the total field is balanced out by the bias current in the detector magnetometer. It will be obvious that when this output voltage appearing across resistor 62 in Fig. 6 just balances the offset voltage across resistor 64, no input direct voltage will be applied to the direct current amplifier 30 and consequently the output voltage, assuming the circuit to be properly balanced in the amplifier, will be zero and the meter will indicate zero.

To take maximum advantage of the field bias feature a large percentage of the field must be balanced out. The percentage which must be balanced out to get a zero indication is determined by the previously described "offset" voltage across resistor 64. The lower this voltage, the greater is the percentage of field balanced out. However, as indicator 32 is to be of the zero center type to give indications of direction of field variation as well as the magnitude thereof, this offset voltage should not be so small that the variations of field encountered in making measurements will reduce the initial net field in the detector magnetometer $M_D$ sufficiently to reverse it. This is because a reversal of field in the detector will not produce a reversed potential across resistor 62 due to the fact that the output polarity of detector 28 does not reverse as the phase of the detector magnetometer output voltage reverses. Consequently, in one direction of meter deflection an ambiguity in readings will take place unless the offset voltage across resistor 64 is greater than the change in voltage which will appear across resistor 62 due to the largest field change which will be net.

It is assumed that the direction of the field applied to the detector magnetometer $M_D$ does not vary and, therefore, the deviation angle $\alpha$ shown in Fig. 1 should remain substantially zero. Consequently, no compensating current output should be derived from the squaring rectifiers 13. With the magnetometer system thus properly oriented the two orienting motors should be rendered incapable of moving the orienting mechanism. Of course, the orienting mechanism should be temporarily fixed stationary so as not to misalign the detector magnetometer while making the adjustments. The purpose for doing this is to aid in adjusting the compensating current output from the two squaring rectifiers 13. The detector magnetometer should then be moved through a small, known angle about the principal axis of the transverse magnetometer (or about an axis parallel thereto) thereby displacing the axial magnetometer an equal amount. The amount of this deflection should be in the order of 1 to 2 degrees and should be carefully determined by any suitable means, not shown. Assuming that the compensating current potentiometers 14 and 15 are out of adjustment this small displacement of the detector magnetometer will cause the indicating instruments 31 and 32 to deflect. The potentiometer 14 should have its slider $C_A$ adjusted until the detector magnetometer may be rotated equal small angles about the principal axis of the transverse magnetometer without causing a deflection from zero position on the indicating instrument. A similar adjustment is made for the transverse magnetometer by deflecting the detector magnetometer back and forth about the principal axis of the axial magnetometer and adjusting the slider $C_T$ of potentiometer 15 until no deflection is observed in the indicating instruments. With the apparatus thus adjusted the orienting motors should again be permitted to drive the magnetometers in response to the output of the two orienting magnetometers.

The gain control 35 should be adjusted so that amplifier 27 is operating about midway the linear part of its characteristic when the input to amplifier 30 is zero.

It is only necessary now to change the amount of field applied to the detector magnetometer $M_D$ by known amounts and adjust the sensitivity control 33 until the indicating instruments 31 and 32 read correctly the amount of change in the magnetic field applied to the detector magnetometer.

No adjustment of the resistances in the field bias control means 19 or rheostat 25 is necessary since by merely predetermining the magnetomotive force generated in the detector magnetometer per ampere of direct current therethrough the various resistances in these networks may be very accurately calculated.

What is claimed is:

1. A system for indicating changes in the strength of a magnetic field comprising in combination a detector magnetometer comprising a core of magnetic material having a principal magnetic axis, two orienting magnetometers each similar to said detector magnetometer, windings on each of said cores, means supporting said three magnetometers with their principal axes mutually perpendicular, a source of alternating current connected to windings of each magnetometer whereby even order harmonic voltages are generated therein of magnitudes proportional respectively to the product of the field strength and the cosine of the angle formed between the principal axis of each core and the direction of the field, an orienting means including electric motor means connected to windings on said two orienting magnetometers and responsive to selected even order harmonic voltages generated therein for maintaining the principal axis of said detector in substantial alignment with the direction of the field to be observed, an electric squaring means responsive to a selected even order harmonic voltage generated in each of the two orienting magnetometers for producing a compensating direct current varying as a function of the sum of their squares, circuits connecting the squaring means to the detector magnetometer whereby the compensating direct current is passed through the detector magnetometer to compensate its response to any small angular misalignment with the field observed, a linear detector for deriving a direct current from a selected one of said even order harmonic voltages generated in said detector magnetometer and an indicating means responsive to the output of the linear detector.

2. A system for indicating changes in the strength of a magnetic field comprising in combination, a detector magnetometer comprising a core of magnetic material having a principal magnetic axis, two orienting magnetometers each similar to said detector magnetometer, windings on each of said cores, means supporting said three magnetometers with their principal axes mutually perpendicular, a source of alternating current connected to windings of each magnetometer whereby even order harmonic voltages are generated therein of magnitudes proportional respectively to the product of the field strength and the cosine of the angle formed between the principal axis of each core and the direction of the field, an orienting means including electric motor means connected to windings on said two orienting magnetometers and responsive to selected even order harmonic voltages generated therein for maintaining the principal axis of said detector in substantial alignment with the direction of the field to be observed, an electric squaring means responsive to a selected even order harmonic voltage generated in each of the two orienting magnetometers for producing a compensating direct current varying as a function of the sum of their squares, a direct current network comprising resistance means connecting the squaring means to a winding on the detector magnetometer whereby the compensating direct current is passed through the detector magnetometer to compensate its response to any small angular misalignment with the field observed, a linear detector for deriving a direct current from a selected one of said even order harmonic voltages generated in said detector magnetometer and an indicating means responsive to the output of the linear detector.

3. A system for indicating changes in the strength of a magnetic field comprising in combination a detector magnetometer comprising a core of magnetic material having a principal magnetic axis, two orienting magnetometers each similar to said detector magnetometer, windings on each of said cores, means supporting said three magnetometers with their principal axes mutually perpendicular, a source of alternating current connected to windings of each magnetometer whereby even order harmonic voltages are generated therein of magnitudes proportional respectively to the product of the field strength and the cosine of the angle formed between the principal axis of each core and the direction of the field, an orienting means including electric motor means connected to windings on said two orienting magnetometers and responsive to selected even order harmonic voltages generated therein for maintaining the principal axis of said detector in substantial alignment with the direction of the field to be observed, an electric squaring means responsive to a selected even order harmonic voltage generated in each of the two orienting magnetometers for producing a compensating direct current varying as a function of the sum of their squares, circuits including a series resistor connecting the squaring means to the detector magnetometer whereby the compensating direct current is passed through the detector magnetometer to compensate its response to any small angular misalignment with the field observed, a source of direct current, a resistive means connecting said source to the detector magnetometer whereby a predetermined amount of the field to be observed may be balanced out by an opposing magnetomotive force produced by the current from said source, a linear detector for deriving a direct current from a selected one of said even order harmonic voltages generated in said detector magnetometer, an indicating means responsive to the output of the linear detector and a source of direct voltage of predetermined magnitude connected in opposition to the output of said linear detector to balance an amount of said output corresponding to a predetermined amount of magnetic field in said detector magnetometer, whereby said indicating means may read zero for said predetermined amount of field and also indicate the magnitude and direction of any variation therefrom.

4. A system for indicating changes in the strength of a magnetic field comprising in combination, a detector magnetometer comprising a core of magnetic material having a principal magnetic axis, two orienting magnetometers each similar to said detector magnetometer, windings on each of said cores, means supporting said three magnetometers with their principal axes mutually perpendicular, a source of alternating current connected to windings of each magnetometer whereby even order harmonic voltages are generated therein of magnitudes proportional respectively to the product of the field strength and the cosine of the angle formed between the principal axis of each core and the direction of the field, orienting means including electric motor means connected to windings on said two orienting magnetometers and responsive to selected even order harmonic voltages generated therein for maintaining the principal axis of said detector in substantial alignment with the direction of the field to be observed, an electric squaring means responsive to a selected even order harmonic voltage generated in each of the two orienting magnetometers for producing a compensating direct current varying as a function of the sum of their squares, circuits including a variable series resistor connecting the squaring means to the detector magnetometer whereby the compensating direct current is passed through the detector magnetometer to compensate its response to any small angular misalignment with the field observed, a source of direct current, a resistive means including a current control means connecting said source to the detector magnetometer whereby a predetermined amount of the field to be observed may be balanced out by an opposing magnetomotive force produced by the current from said source, a mechanical linkage mechanically connecting said variable series resistor and said current control means for simultaneous operation, a linear detector for deriving a direct current from a selected one of said even order harmonic voltages generated in said detector magnetometer, and an indicating means responsive to the output of the linear detector.

5. The combination in accordance with claim 1 and a source of direct voltage of predetermined magnitude connected in opposition to the output of said linear detector to balance an amount of said output corresponding to a predetermined amount of magnetic field in said detector magnetometer, whereby said indicating means may read zero for said predetermined amount of field and also indicate the magnitude and direction of any variation therefrom.

6. The combination in accordance with claim 2 and a source of direct voltage of predetermined magnitude connected in opposition to the output of said linear detector to balance an amount of said output corresponding to a predetermined amount of magnetic field in said detector magnetometer, whereby said indicating means may read zero for said predetermined amount of field and also indicate the magnitude and direction of any variation therefrom.

7. A system for indicating changes in the strength of a magnetic field comprising in combination, a detector magnetometer comprising a core of magnetic material having a principal magnetic axis, two orienting magnetometers each similar to said detector magnetometer, windings on each of said cores, means supporting said three magnetometers with their principal axes mutually perpendicular, a source of alternating current connected to windings of each magnetometer whereby even order harmonic voltages are generated therein of magnitudes proportional respectively to the product of the field strength and the cosine of the angle formed between the principal axis of each core and the direction of the field, orienting means including electric motor means connected to windings on said two orienting magnetometers and responsive to selected even order harmonic voltages generated therein for maintaining the principal axis of said detector in substantial alignment with the direction of the field to be observed, an electric squaring means responsive to a selected even order harmonic voltage generated in each of the two orienting magnetometers for producing a compensating direct current varying as a function of the sum of their squares, circuits including a variable series resistor connecting the squaring means to the detector magnetometer whereby the compensating direct current is passed through the detector magnetometer to compensate its response to any small angular misalignment with the field observed, a source of direct current, a resistive means including a current control means connecting said source to the detector magnetometer whereby a predetermined amount of the field to be observed may be balanced out by an opposing magnetomotive force produced by the current from said source, a linear detector for deriving a direct current from a selected one of said even order harmonic voltages generated in said detector magnetometer, an indicating means responsive to the output of the linear detector, and a source of direct voltage of predetermined magnitude connected in opposition to the output of said linear detector to balance an amount of said output corresponding to a predetermined amount of magnetic field in said detector magnetometer, whereby said indicating means may read zero for said predetermined amount of field and also indicate the magnitude and direction of any variation therefrom.

EDWIN P. FELCH, JR.
FRANCIS G. MERRILL.
THADDEUS SLONCZEWSKI.

REFERENCES CITED

The following references are of record in the file of this patent:

UNITED STATES PATENTS

| Number | Name | Date |
| --- | --- | --- |
| 2,047,609 | Antranikian | July 14, 1936 |
| 2,053,154 | La Pierre | Sept. 1, 1936 |
| 2,379,716 | Hull | July 3, 1945 |
| 2,406,870 | Vacquier | Sept. 3, 1946 |
| 2,407,202 | Vacquier | Sept. 3, 1946 |

OTHER REFERENCES

Transactions American Institute of Mining and Metallurgical Engineers, Geophysical Prospecting, 1932, pages 213 and 214.